United States Patent
Osuga et al.

(10) Patent No.: US 11,251,675 B2
(45) Date of Patent: Feb. 15, 2022

(54) MOTOR

(71) Applicant: Nidec Corporation, Kyoto (JP)

(72) Inventors: Shohei Osuga, Kyoto (JP); Takahiro Hiwa, Kyoto (JP); Yohei Miyata, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 200 days.

(21) Appl. No.: 16/486,841

(22) PCT Filed: Dec. 27, 2017

(86) PCT No.: PCT/JP2017/046869
§ 371 (c)(1),
(2) Date: Aug. 19, 2019

(87) PCT Pub. No.: WO2018/150743
PCT Pub. Date: Aug. 23, 2018

(65) Prior Publication Data
US 2021/0135534 A1 May 6, 2021

(30) Foreign Application Priority Data
Feb. 20, 2017 (JP) .............................. JP2017-029531

(51) Int. Cl.
*H02K 5/14* (2006.01)
*H02K 5/20* (2006.01)
(Continued)

(52) U.S. Cl.
CPC .............. *H02K 5/148* (2013.01); *H02K 5/20* (2013.01); *H02K 5/225* (2013.01); *H02K 11/026* (2013.01)

(58) Field of Classification Search
CPC .......... H02K 5/14; H02K 5/143; H02K 5/145; H02K 5/146; H02K 5/148; H02K 5/20; H02K 5/207; H02K 13/00; H02K 13/006
(Continued)

(56) References Cited

U.S. PATENT DOCUMENTS 4,801,833 A * 1/1989 Dye ........................ H01R 39/38
310/239
6,404,086 B1 6/2002 Fukasaku et al.
(Continued)

FOREIGN PATENT DOCUMENTS

| JP | 60-42058 U | 3/1985 |
| JP | 08-214508 A | 8/1996 |

(Continued)

OTHER PUBLICATIONS

Omura, Machine Translation of JP2003009459, Jan. 2003 (Year: 2003).*

(Continued)

*Primary Examiner* — Quyen P Leung
*Assistant Examiner* — Eric Johnson
(74) *Attorney, Agent, or Firm* — Keating & Bennett (57) ABSTRACT

A motor includes a rotor, a back cover, a housing, and a brush card assembly. The rotor includes a core fixed to a shaft, a coil that magnetizes a core, and a commutator connected to the coil. The back cover includes a back cover bottom surface portion, and a back cover cylindrical portion on an outer periphery of the back cover bottom surface portion to have a cylindrical shape. The brush card assembly includes a brush card bottom surface portion spaced apart from the back cover bottom surface portion in an axial direction through a first gap. The brush card bottom surface holds brushes and includes a nip portion nipped by the back cover and the housing, an outer peripheral wall spaced apart (Continued)

from the back cover cylindrical portion in a radial direction through a second gap, and contact portions contacting the back cover cylindrical portion.

14 Claims, 9 Drawing Sheets

(51) Int. Cl.
    *H02K 5/22*     (2006.01)
    *H02K 11/026*     (2016.01)

(58) Field of Classification Search
    USPC ........................................................ 310/238
    See application file for complete search history.

(56) References Cited

U.S. PATENT DOCUMENTS

| | | | |
|---|---|---|---|
| 2002/0050759 A1* | 5/2002 | Shiraki | H02K 5/145 |
| | | | 310/239 |
| 2011/0006636 A1 | 1/2011 | Shin et al. | |
| 2015/0130310 A1* | 5/2015 | Shiraishi | H02K 5/10 |
| | | | 310/88 |
| 2015/0326099 A1 | 11/2015 | Qin et al. | |
| 2015/0372560 A1* | 12/2015 | Liang | H02K 13/006 |
| | | | 310/71 |
| 2016/0285340 A1* | 9/2016 | Hiwa | H02K 5/148 |
| 2016/0294245 A1 | 10/2016 | Hamagishi et al. | |
| 2017/0279341 A1* | 9/2017 | Ishikawa | F04B 39/0044 |

FOREIGN PATENT DOCUMENTS

| | | | |
|---|---|---|---|
| JP | 08340654 A | * | 12/1996 |
| JP | 09-247906 A | | 9/1997 |
| JP | 10-127007 A | | 5/1998 |
| JP | 2003009459 A | * | 1/2003 |
| JP | 2006197788 A | * | 7/2006 |
| JP | 2007-300739 A | | 11/2007 |
| JP | 2010-110134 A | | 5/2010 |

OTHER PUBLICATIONS

Fujiwara, Machine Translation of JP08340654, Dec. 1996 (Year: 1996).*
Tomiya, Machine Translation of JP2006197788, Jul. 2006 (Year: 2006).*
Kimura, Machine Translation of JP2010110134, May 2010 (Year: 2010).*
Official Communication issued in International Patent Application No. PCT/JP2017/046869, dated Feb. 27, 2018.

* cited by examiner

MOTOR

CROSS REFERENCE TO RELATED APPLICATIONS

This application is a U.S. national stage of PCT Application No. PCT/JP2017/046869, filed on Dec. 27, 2017, and priority under 35 U.S.C. § 119(a) and 35 U.S.C. § 365(b) is claimed from Japanese Application No. 2017-029531, filed Feb. 20, 2017; the entire disclosures of each application are incorporated herein by reference.

FIELD OF THE INVENTION

The present disclosure relates to a motor.

BACKGROUND

Conventionally, the direct current machine having a brush holding body for holding brushes and other components is known. In addition, the brush holder having a brush is known.

In the conventional brush holding body, since a fixing flange is only clamped between a housing and a cover, a support state of the brush holding body may become unstable when a motor rotates. Further, flowability of gas around the brush holding body is insufficient, which may cause heat generation.

SUMMARY

One example embodiment of the present disclosure provides a motor including a rotor including a shaft that extends in an axial direction with respect to a central axis, a permanent magnet positioned on a radially outer side of the rotor, a brush card assembly that supplies power to the rotor, a back cover that supports the brush card assembly, and a housing that accommodates the brush card assembly, the rotor, and the permanent magnet together with the back cover. The rotor includes a core fixed to the shaft, a coil that magnetizes the core, and a commutator electrically connected to the coil. The back cover includes a back cover bottom surface portion, and a back cover cylindrical portion on an outer periphery of the back cover bottom surface portion to have a cylindrical shape. The brush card assembly includes a brush card bottom surface portion spaced apart from the back cover bottom surface portion in the axial direction through a first gap and configured to hold a plurality of brushes, a nip portion nipped by the back cover and the housing, an outer peripheral wall spaced apart from the back cover cylindrical portion in a radial direction through a second gap, and contact portions in contact with the back cover cylindrical portion on the outer peripheral wall. At least one side of the housing and the back cover includes a flow hole through which at least one side of the first gap and the second gap is in communication with an outer space of the motor.

The above and other elements, features, steps, characteristics and advantages of the present disclosure will become more apparent from the following detailed description of the preferred example embodiments with reference to the attached drawings.

DETAILED DESCRIPTION

Hereinafter, example embodiments of the present disclosure will be described with reference to the accompanying drawings. However, example embodiments described below are merely examples of the present disclosure, and the technical scope of the present disclosure is not to be limitedly interpreted. In addition, in the drawings, the same components are denoted by the same reference numerals, and descriptions thereof may be omitted.

In this specification, an "upper side" or "front side" and a "lower side" or "rear side" with respect to a rotation central axis J of a motor are arbitrarily defined and described. In addition, an upper surface of each configuration such as a rotor unit or the like may be referred to as an "upper surface" and a lower surface may be referred to as a "bottom surface."

In this specification, a plane parallel to a direction in which the central axis J extends is referred to as an XY plane having an X axis and a Y axis. Further, for convenience of description of the drawings, one side with respect to the X axis is referred to as an upper side and the other side as a lower side, and one side with respect to the Y axis is referred to as an left side and the other side as a right side.

In addition, in this specification, the term "extending in an axial direction" includes the case of extending in a direction inclined at an angle less than 45 degrees with respect to the axial direction in addition to the case of extending in the axial direction strictly parallel to the central axis J. Likewise, the term "extending in a radial direction" includes the case of extending in a direction inclined at an angle less than 45 degrees with respect to a direction perpendicular to the central axis in addition to the case of extending in a direction strictly perpendicular to the central axis J.

Figure 1:
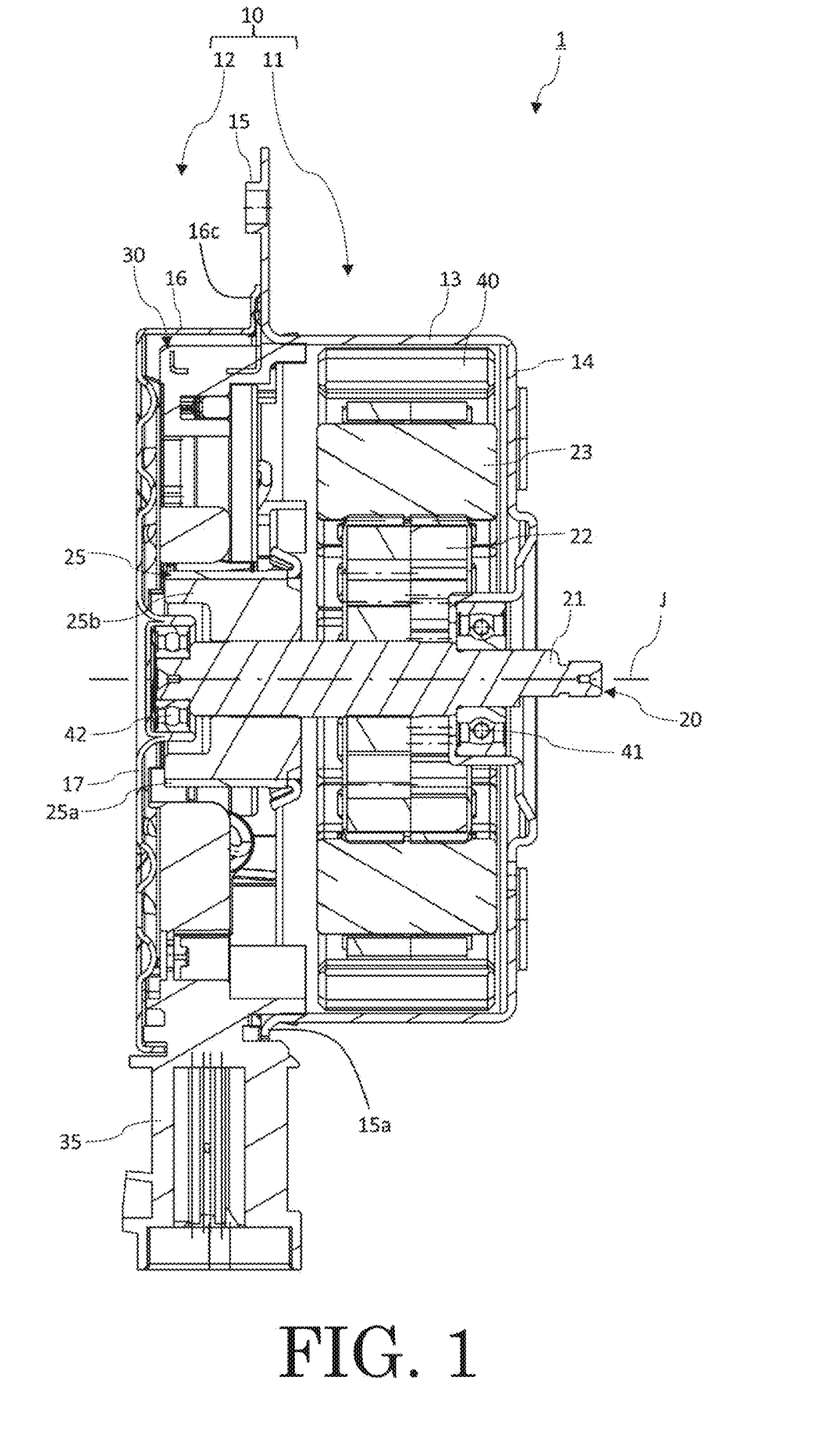
FIG. 1 is a cross-sectional view of a motor according to an example embodiment of the present disclosure.

A motor 1 according to the present example embodiment is a motor used for rotating an engine cooling fan. As shown in FIG. 1, in the motor 1 of the present example embodiment, a central axis J is arranged so as to extend in a direction perpendicular to a direction of gravity, but the present disclosure is not limited to the arrangement. That is, the central axis J has a predetermined angle with respect to the direction of gravity.

FIG. 1 is a cross-sectional view of the motor 1 of the present example embodiment. As shown in FIG. 1, the motor 1 of the present example embodiment includes a housing body 10, a rotor 20, a brush card assembly 30, a permanent magnet 40, a front side bearing 41, and a rear side bearing 42. An impeller (not shown) is attached to a shaft 21 of the rotor 20 of the motor 1 used as a fan. Further, an output end side of the shaft 21, which is a right side of FIG. 1 to which the impeller is attached, is referred to as a front side or an upper side, and a left side of FIG. 1 is referred to as a rear side or a lower side.

Figure 2:
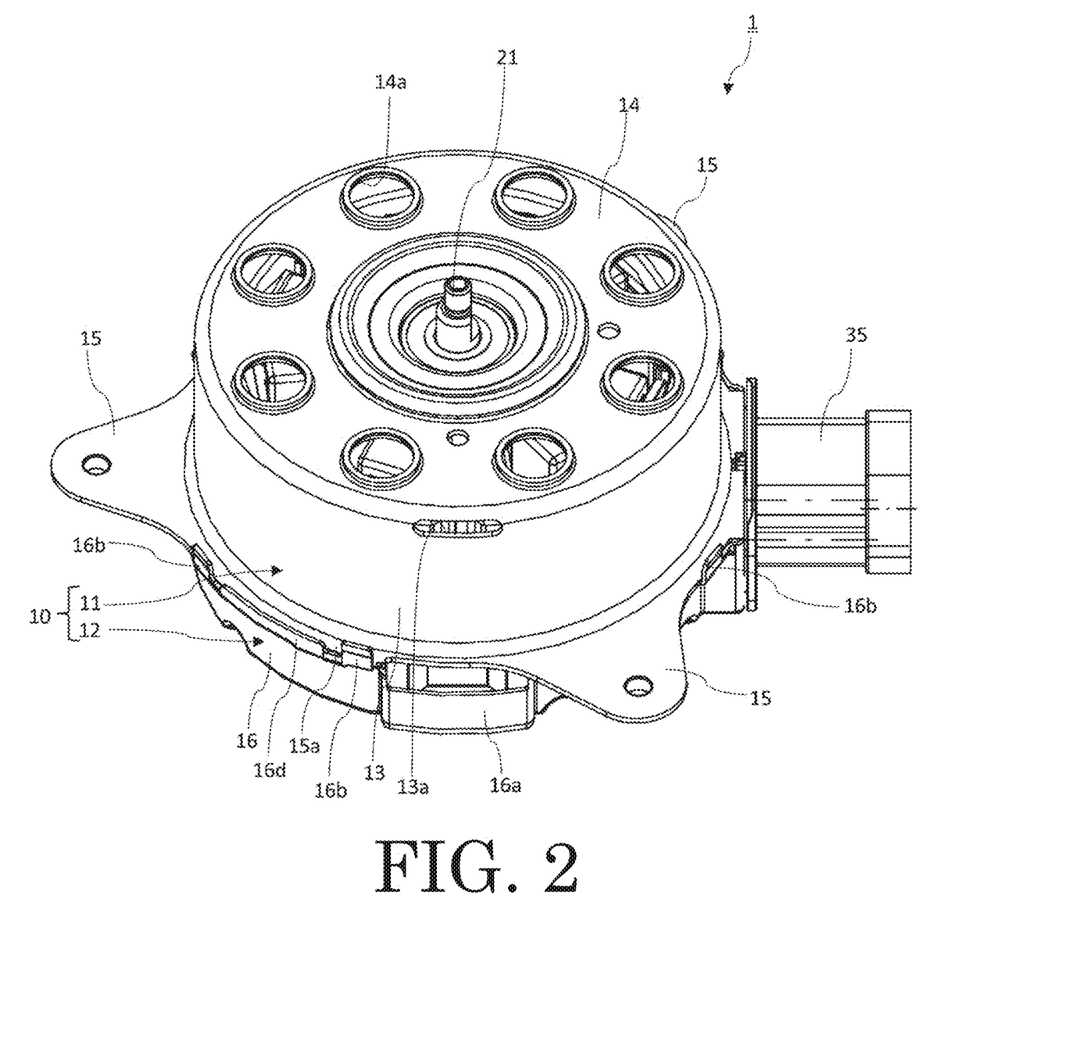
FIG. 2 is a perspective view of the motor when viewed from an upper surface of a housing according to an example embodiment of the present disclosure.
Figure 3:
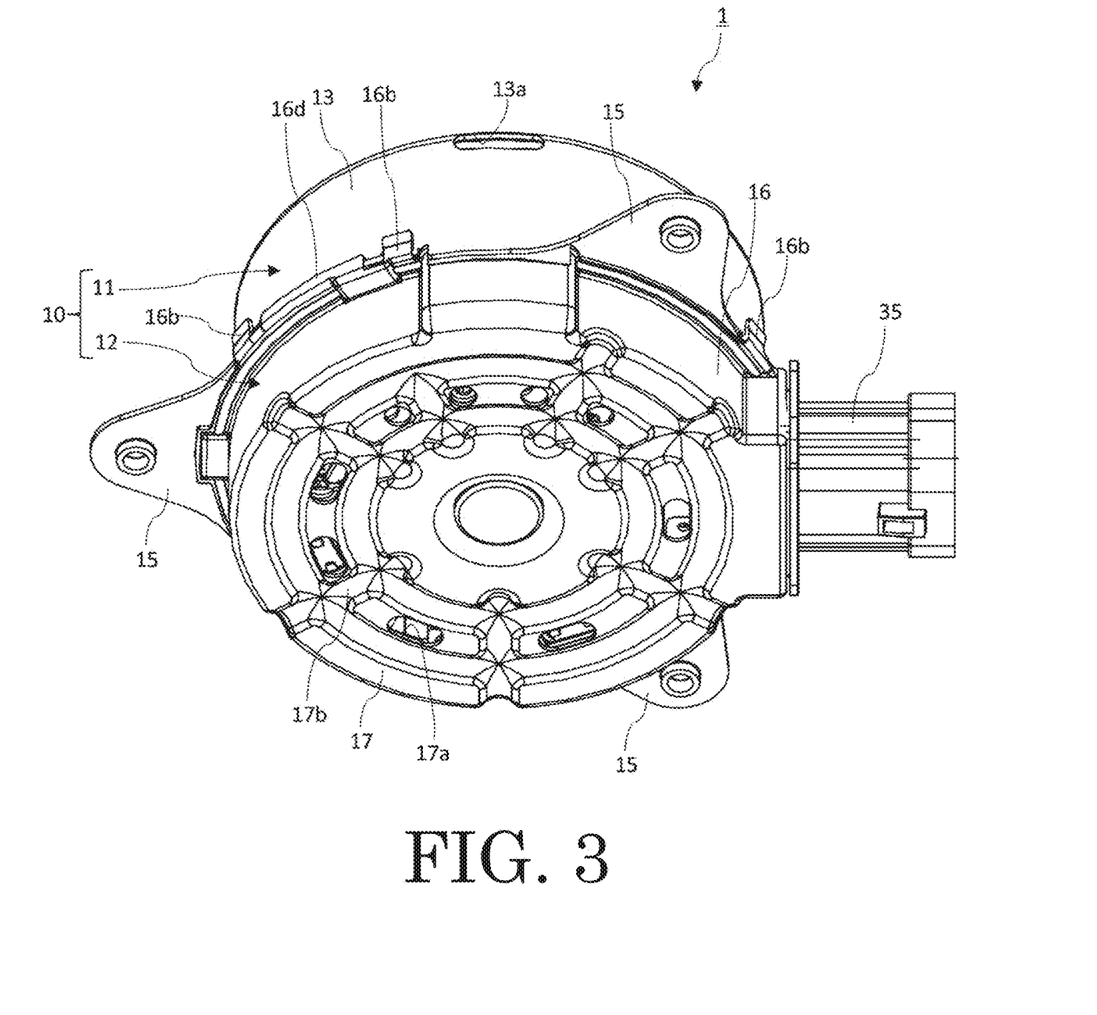
FIG. 3 is a perspective view of the motor when viewed from a bottom surface of a back cover according to an example embodiment of the present disclosure.

FIGS. 2 and 3 are external perspective views of the motor 1. FIG. 2 is a view of the motor 1 when viewed from an upper surface of a housing 11, and FIG. 3 is a view of the motor 1 when viewed from a bottom surface of a back cover 12. The housing body 10 includes the housing 11 and the back cover 12, as shown in FIGS. 1 to 3. The housing body 10 accommodates the rotor 20, the brush card assembly 30, the permanent magnet 40, the front side bearing 41, and the rear side bearing 42. Further, the term "accommodating" includes both of the case in which an entirety of an object to be accommodated is positioned inside a container and the case in which a portion of the object to be accommodated is positioned inside the container.

The housing 11 is positioned closer to a front side than the back cover 12. The housing 11 has a housing cylindrical portion 13, a housing upper surface portion 14, and flange portions 15. The housing 11 includes a conductive member such as a metal or the like.

The housing cylindrical portion 13 has a cylindrical shape concentric with the central axis J. The housing cylindrical portion 13 has a cylindrical shape extending in an axial direction from an outer periphery of the housing upper surface portion 14 toward a rear side. The housing cylindrical portion 13 surrounds radially outer sides of the rotor 20 and the permanent magnet 40. The permanent magnet 40 is fixed to an inner surface of the housing cylindrical portion 13.

As shown in FIGS. 2 and 3, the housing cylindrical portion 13 has a housing through-hole 13a which is positioned close to a connecting portion with the housing upper surface portion 14 and passes through the housing cylindrical portion 13 in the radial direction. The housing through-hole 13a has, for example, an elongated hole shape extending in a circumferential direction. An arbitrary number, at least one or more, of housing through-holes 13a are formed. Gas or liquid inside the housing body 10 is discharged to an outer side of the housing body 10 through the housing through-hole 13a. Further, gas or liquid may be introduced into the housing body 10 from the outer side, or water droplets may be generated inside the housing body 10 due to condensation.

The housing upper surface portion 14 is connected to a front side end portion of the housing cylindrical portion 13. The housing upper surface portion 14 has a disk shape concentric with the central axis J. The housing upper surface portion 14 has a plurality of upper surface side hole portions 14a passing through the housing upper surface portion 14 in the axial direction. The upper surface side hole portion 14a has, for example, a circular shape. The upper surface side hole portions 14a are arranged at regular intervals along the circumferential direction with respect to the central axis J. An arbitrary number, at least one or more, of upper surface side hole portions 14a are formed and, for example, eight upper surface side hole portions 14a are formed, as shown in FIG. 2. The upper surface side hole portions 14a dissipate heat in the housing body 20 by circulating air inside and outside the housing body 10.

The flange portions 15 extend radially outward from a rear side end portion of the housing cylindrical portion 13 with an interval in the circumferential direction. The motor 1 is attached to a fan device for cooling an engine through the flange portions 15.

The back cover 12 is positioned closer to a rear side than the housing 11. The back cover 12 has a back cover cylindrical portion 16 and a back cover bottom surface portion 17. The back cover 12 is a conductive member such as a metal or the like.

The back cover cylindrical portion 16 has a cylindrical shape concentric with the central axis J. The back cover cylindrical portion 16 has a cylindrical shape extending in the axial direction from an outer periphery of the back cover bottom surface portion 17 toward a front side. The back cover cylindrical portion 16 surrounds a portion of the rotor 20 and a radially outer side of the brush card assembly 30. The brush card assembly 30 is disposed on an inner surface of the back cover cylindrical portion 16. As shown in FIG. 2, the back cover cylindrical portion 16 has a protrusion 16a protruding radially outward.

The back cover bottom surface portion 17 is provided on a rear side end portion of the back cover cylindrical portion 16. The back cover bottom surface portion 17 has a disk shape concentric with the central axis J. The back cover bottom surface portion 17 has a plurality of bottom surface side hole portions 17a passing through the back cover bottom surface portion 17 in the axial direction. The bottom surface side hole portion 17a has, for example, an elongated hole shape extending in the circumferential direction. An arbitrary number, at least one or more, of bottom surface side hole portions 17a are formed but may be omitted. The back cover bottom surface portion 17 has a plurality of convex portions 17b radially extending in the radial direction. The convex portions 17b protrude with respect to the back cover bottom surface portion 17 and have a shape protruding from the rear side to the front side.

The housing cylindrical portion 13 of the housing 11 is connected to the back cover cylindrical portion 16 of the back cover 12 by being swaged.

Specifically, as shown in FIGS. 2 and 3, the back cover cylindrical portion 16 has a cover side flange portion 16c, six claw portions 16b, and two cover side outer peripheral walls 16d. A rear side end portion of the cover side flange portion 16c extends radially outward. The six claw portions 16b extend in the circumferential direction with an interval toward the front side at an outer edge of the cover side flange portion 16c. The two cover side outer peripheral walls 16d extend between the claw portions 16b adjacent to the outer side edge of the cover side flange portion 16c toward the front side. The six claw portions 16b are arranged at positions at which three flange portions 15 are placed between the six claw portions 16b by the two claw portions 16b. The housing cylindrical portion 13 has a housing side flange portion 15a extending radially outward on a rear side end portion thereof. The housing side flange portion 15a is on the same level with the flange portion 15. The housing 11 and the back cover 12 are in contact with the housing side flange portion 15a and the cover side flange portion 16c, which face each other in the axial direction, a portion of an outer side edge of the housing side flange portion 15a is in contact with each of the claw portions 16b and an inner circumferential surface of each of the cover side outer peripheral walls 16d, and the claw portions 16b are plastically deformed by being inclined radially inward. Since inner diameters of the claw portions 16b and the cover side outer peripheral walls 16d are slightly smaller than an outer diameter of the housing side flange portion 15a, the housing 11 is press-fitted into the back cover 12 so that the housing 11 and the back cover 12 are connected.

Further, as shown in FIG. 3, the six claw portions 16b are arranged at positions overlapping the convex portion 17b of the back cover bottom surface portion 17 in the circumferential direction in a plane perpendicular to the central axis J. That is, in plan view from the axial direction, the six claw portions 16b are arranged on radially outer sides of the convex portions 17b extending in the radial direction, respectively.

As described above, since the housing 11 and the back cover 12 are connected by press-fitting and caulking using the claw portions 16b, occurrence of relative positional deviation between the housing 11 and the back cover 12 may be suppressed. Accordingly, since the positional deviation or inclination of a rotation shaft may be suppressed, it is possible to suppress occurrence of excessive friction or abnormal noise between brushes 51a to 51d and a commutator 25 when the motor 1 rotates.

Further, in plan view, since the convex portion 17b is positioned at a position overlapping the claw portion 16b in the circumferential direction, it is possible to suppress stress acting on the back cover 12 when the claw portion 16b is caulked from being spread to the back cover 12 and to suppress the back cover 12 from being deformed. That is, since rigidity of a portion of the back cover bottom surface portion 17 in which the convex portion 17b is positioned is higher than that of the other portion, the influence of the stress is less likely to occur.

Further, in the above example, it is described that the housing 11 has the flange portions 15 and the back cover 12 has the claw portion 16b. However, the housing 11 may have the claw portion 16b and the back cover 12 may have the flange portions 15. Further, the number of flange portions 15 and the number of claw portions 16b may be designed arbitrarily. However, in a configuration having three flange portions 15 and six claw portions 16b, it is particularly preferable that the housing 11 and the back cover 12 may be fixed necessarily and sufficiently.

Figure 4:
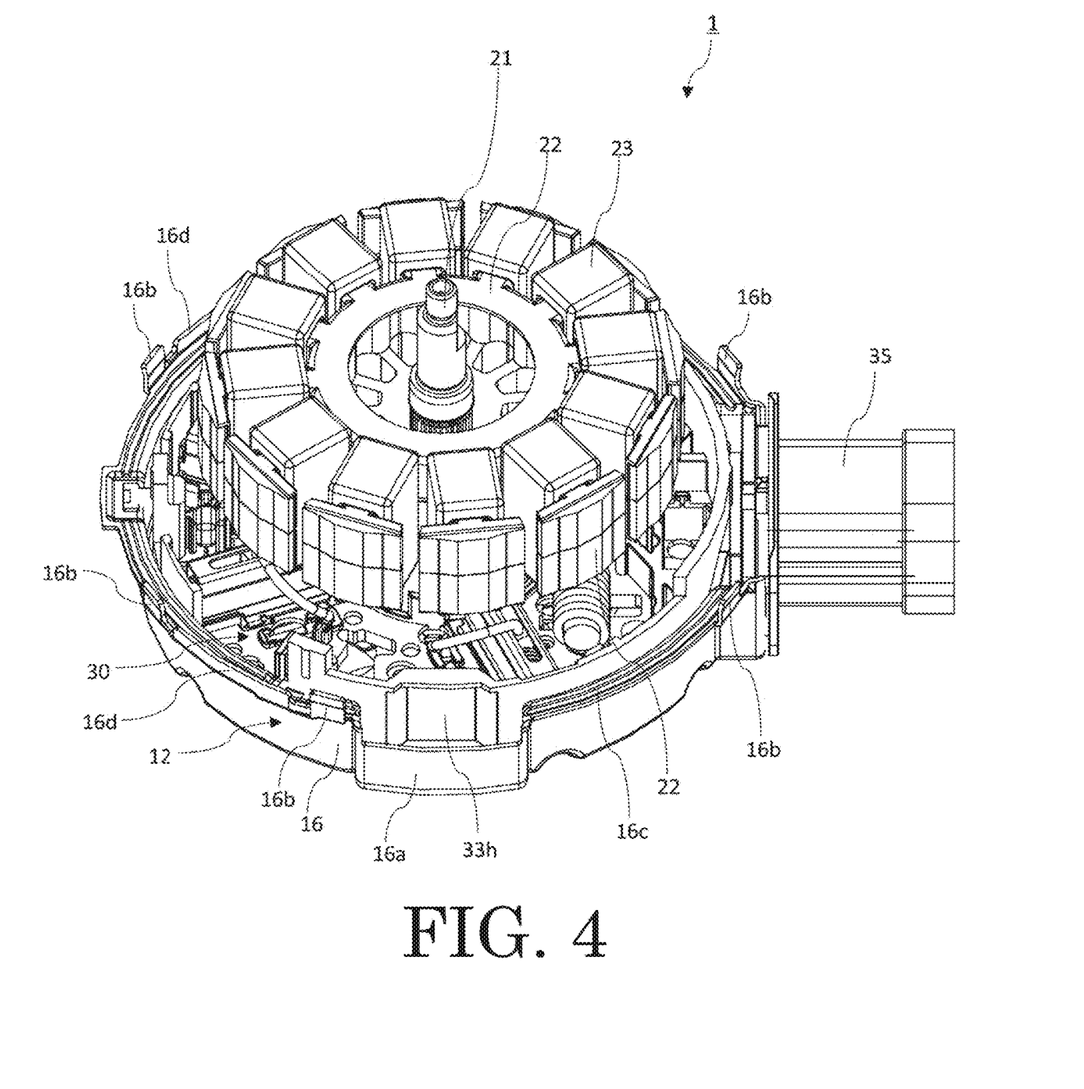
FIG. 4 is a view showing the motor in a state in which a housing and a permanent magnet are removed.

FIG. 4 is a view showing the motor 1 in a state in which the housing 11 and the permanent magnet 40 are removed. As shown in FIGS. 1 and 4, the rotor 20 has the shaft 21, a core 22, a coil 23, and the commutator 25.

The shaft 21 extends to have a cylindrical shape in the axial direction with respect to the central axis J. A front side end portion of the shaft 21 is exposed to an outer side of a front side of the housing 11. A fan is connected to the front side end portion of the shaft 21.

The core 22 is fixed to the shaft 21. The core 22 is positioned inside the housing 11 in the radial direction. The core 22 is opposite to the permanent magnet 40 in the radial direction. The core 22 includes a core back and a plurality of teeth portions. The plurality of teeth portions are arranged at regular intervals along the circumferential direction.

The coil 23 magnetizes the core 22 by energization. The coil 23 is wound around the teeth portions of the core 22 through an insulator having an insulating property. For example, the coil 23 is wound around the core 22 in a concentrated winding manner.

The commutator 25 is positioned on a rear side of the core 22. The commutator 25 includes an insulating member 25a and a plurality of segments 25b.

The insulating member 25a is a member having insulating properties. The insulating member 25a has, for example, a cylindrical shape surrounding a radially outer side of the shaft 21. The insulating member 25a is fitted to an outer circumferential surface of the shaft 21.

The plurality of segments 25b are fixed to an outer side surface of the insulating member 25a. The plurality of segments 25b are arranged at regular intervals in the circumferential direction. Each of the plurality of segments 25b is a conductor extending in the axial direction. The segments 25b are electrically connected to the coil 23. Outer surfaces of the segments 25b in the radial direction may be in contact with the brushes 51a to 51d to be described below. The segments 25b in contact with the brushes 51a to 51d are changed according to the rotation of the rotor 20. That is, the commutator 25 is electrically connected to the coil 23.

The permanent magnet 40 is fixed to an inner side of the housing 11. The permanent magnet 40 is positioned on a radially outer side of the rotor 20 and is disposed to face the rotor 20. The permanent magnet 40 has, for example, a circular arc shape extending in the circumferential direction. For example, four permanent magnets 40 are provided along the circumferential direction. The permanent magnet 40 has two magnetic poles at one end and the other end in the circumferential direction. That is, the number of magnetic poles of the permanent magnets 40 is eight. However, the number of magnetic poles of the permanent magnets 40 may be arbitrarily changed.

The front side bearing 41 and the rear side bearing 42 support the shaft 21. The front side bearing 41 is positioned on a front side of the core 22. The front side bearing 41 is held by the housing 11. The rear side bearing 42 supports an end portion of the shaft 21 on a rear side of the commutator 25. The rear side bearing 42 is held by the back cover 12.

The brush card assembly 30 is positioned on the rear side of the core 22 of the rotor 20. The brush card assembly 30 is disposed in the back cover 12. The brush card assembly 30 supplies a current to the rotor 20 through the commutator 25.

Figure 5:
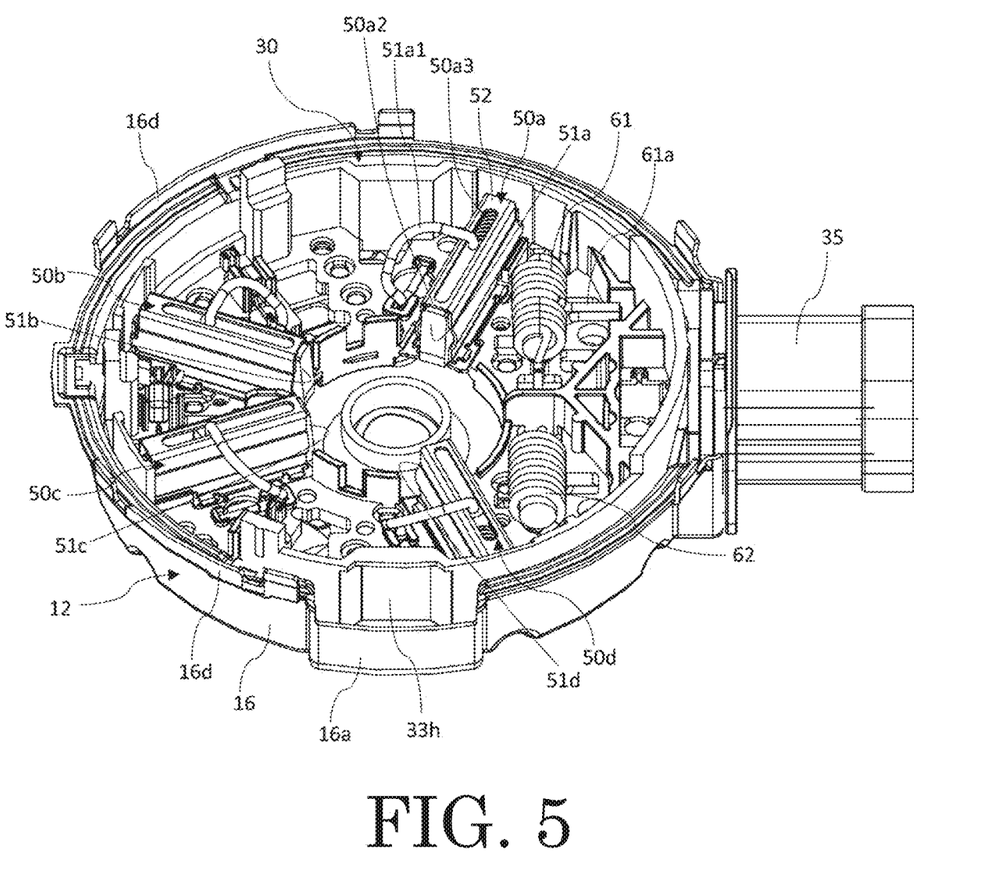
FIG. 5 is a perspective view of a back cover and a brush card assembly according to an example embodiment of the present disclosure when viewed from a front side.
Figure 6:
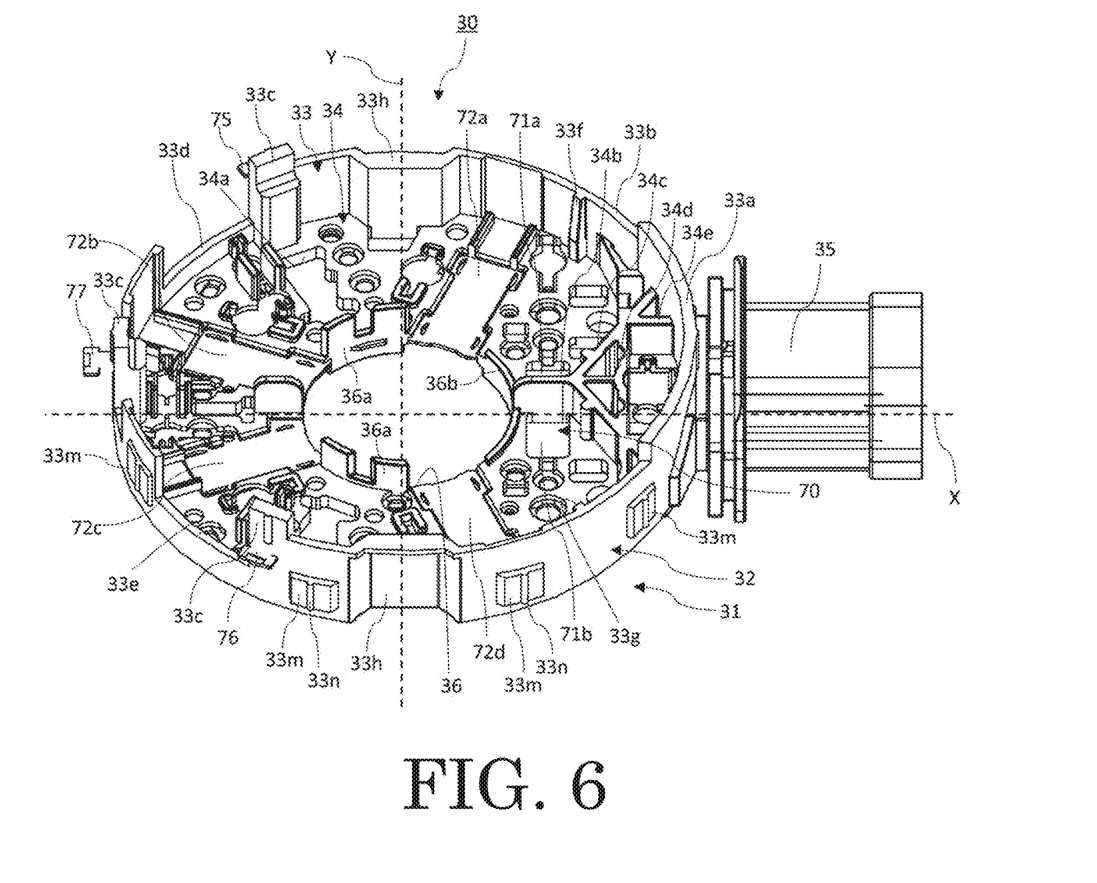
FIG. 6 is a perspective view of a brush card assembly according to an example embodiment of the present disclosure.
Figure 7:
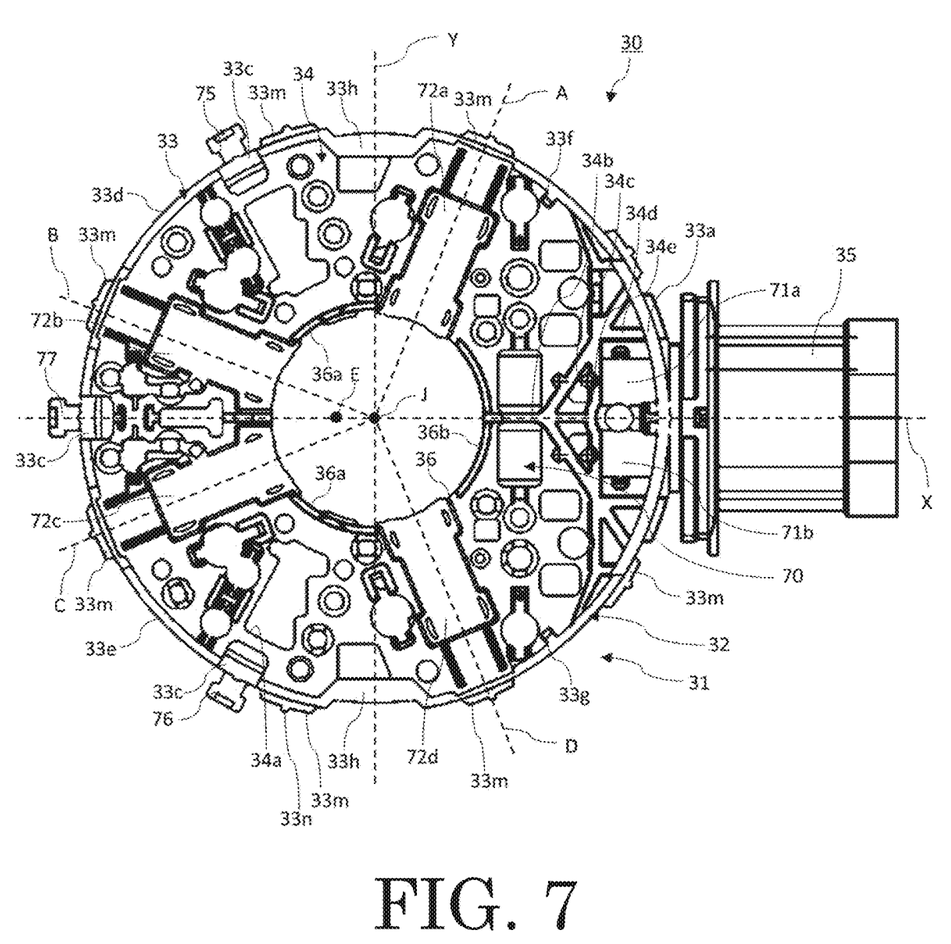
FIG. 7 is a plan view of the brush card assembly.

FIG. 5 is a perspective view of the back cover 12 and the brush card assembly 30 when viewed from a front side. FIG. 6 is a perspective view of the brush card assembly 30 when viewed from a front side. FIG. 7 is a plan view of the brush card assembly 30 when viewed from a front side. In FIGS. 6 and 7, electronic parts, etc. are omitted for convenience of description. In FIGS. 6 and 7, the X-axis and the Y-axis which are perpendicular to the central axis J are shown.

The brush card assembly 30 has a brush card 31, brush units 50a to 50d, and choke coils 61 and 62. The brush units 50a to 50d have the brushes 51a to 51d, respectively.

The brush card 31 has a plate portion 70 and a resin portion 32. The brush card 31 is formed by insert molding in which the plate portion 70 is inserted into a mold. The brush units 50a to 50d and the choke coils 61 and 62 are attached to the brush card 31.

The plate portion 70 is formed of, for example, a conductive member such as brass or copper. The plate portion 70 is electrically connected to the components including the choke coils 61 and 62 to constitute a circuit. The plate portion 70 supplies a current to the rotor 20. The plate portion 70 has a positive electrode side connection terminal 71a, a negative electrode side connection terminal 71b, brush unit installation portions 72a to 72d, and nip portions 75 to 77. In the plate portion 70, a portion which is connected to another component is exposed to the outside, and the other portion is covered with a resin.

The positive electrode side connection terminal 71a is connected to the choke coil 61. The choke coil 61 is, for example, a fuse-equipped choke coil having a fuse 61a. With the configuration having the choke coil 61, noise included in the supplied power may be reduced. Further, when an over current flows due to, for example, a portion of an electric circuit being short-circuited, it is possible to prevent an abnormal current from flowing back to a power source by the fuse being operating. The negative electrode side connection terminal 71b is connected to the choke coil 62.

The brush units 50a to 50d are provided in the brush unit installation portions 72a to 72d, respectively. The brush unit installation portions 72a to 72d themselves do not constitute a circuit. Each of pigtails extending from the brushes 51a to 51d in the brush units 50a to 50d is electrically connected to the plate portion 70 that constitutes a circuit.

The nip portions 75 to 77 are plate-shaped members extending radially outward from an outer peripheral position of the plate portion 70. The nip portions 75 to 77 are each grounded through a capacitor. As shown in FIGS. 6 and 7, the three nip portions 75 to 77 are positioned on a left side with respect to the Y axis opposite to a right side in which the connector portion 35 is disposed, in the plate portion 70.

The nip portions 75 to 77 are positioned between the housing 11 and the back cover 12 in the axial direction. The nip portions 75 to 77 are nipped in the axial direction by the housing 11 and the back cover 12. Accordingly, the brush card assembly 30 is held by the nip portions 75 to 77 which are nipped by the housing 11 and the back cover 12. Further, the housing 11 and the back cover 12 are swaged while nipping the nip portions 75 to 77. The nip portions 75 to 77 are ground potentials as described above. However, the nip portions 75 to 77 may also be electrically connected by being nipped by the housing 11 and the back cover 12 having conductivity, and thus the ground potentials may be stabilized. Further, the ground potential is also referred to as a reference potential.

The resin portion 32 is a portion of a resin which covers a predetermined portion of the plate portion 70. The resin portion 32 has a brush card cylindrical portion 33, a brush card bottom surface portion 34, and a connector portion 35.

The brush card cylindrical portion 33 has a cylindrical shape partially cut out. The brush card cylindrical portion 33 is a portion extending in the axial direction from an outer edge of the brush card bottom surface portion 34. The brush card cylindrical portion 33 has a connector outer peripheral wall 33a, a brush outer peripheral wall 33b, notch portions 33d and 33e, outer peripheral ribs 33f and 33g, a brush card concave portion 33h, and a contact portion 33m. The connector outer peripheral wall 33a and the brush outer peripheral wall 33b are collectively referred to as outer peripheral walls (see FIG. 8). The outer peripheral walls of the brush card cylindrical portion 33 face an inner peripheral wall of the back cover cylindrical portion 16. Accordingly, the outer peripheral walls of the brush card cylindrical portion 33 are spaced apart from the back cover cylindrical portion 16 in the radial direction by a second gap A2. That is, the second gap A2 serving as a space through which air and liquid can flow is formed between the outer peripheral walls of the brush card cylindrical portion 33 and the back cover cylindrical portion 16.

The connector outer peripheral wall 33a is a portion connected to the connector portion 35. The connector outer peripheral wall 33a is disposed on the right side with respect to the Y-axis. The connector outer peripheral wall 33a is longer in the axial direction than the brush outer peripheral wall 33b.

The brush outer peripheral wall 33b is positioned on radially outer sides of the brush units 50a to 50d. The notch portions 33d and 33e are positioned on the left side with respect to the Y-axis on the brush outer peripheral wall 33b. The notch portions 33d and 33e are portions in which an axial length is shortened as compared with axial lengths of the other portions of the brush outer peripheral wall 33b. In other words, the notch portions 33d and 33e each have a shape partially cut out in the axial direction with respect to the other portions of the brush outer peripheral wall 33b.

That is, the outer peripheral walls including the connector outer peripheral wall 33a and the brush outer peripheral wall 33b are discontinuous on two left portions of the Y-axis due to the notch portions 33d and 33e and are continuous on a right portion of the Y-axis. Therefore, the outer peripheral walls each have a higher rigidity on the right portion of the Y-axis than on the left portion of the Y-axis. That is, the rigidity on the right portion of the Y-axis of the brush card assembly 30 becomes higher than the rigidity on the left portion of the Y-axis. Further, the gas or liquid inside the brush card assembly 30 is discharged from the notch portions 33d and 33e to the outer side of the brush card assembly 30.

The nip portion support wall portion 33c is a portion which supports the nip portions 75 to 77. The nip portion support wall portion 33c covers a connection portion between the nip portions 75 to 77 and the plate portion 70.

The outer peripheral ribs 33f and 33g are positioned on the right side of the Y-axis. The outer peripheral ribs 33f and 33g are provided on an inner peripheral side of the brush outer peripheral wall 33b. The outer peripheral ribs 33f and 33g have the same height as the brush outer peripheral wall 33b and extend in the axial direction from the brush card bottom surface portion 34. In each of the outer peripheral ribs 33f and 33g, one end thereof, which is in contact with the brush card bottom surface portion 34, extends in the radial direction with respect to the other end. The outer peripheral rib 33f is disposed at a position closer to the connector portion 35 than the brush unit installation portion 72a in the circumferential direction. The outer circumferential rib 33g is disposed at a position closer to the connector portion 35 than the brush unit installation portion 72d in the circumferential direction. The rigidity of the right portion with respect to the Y-axis in the brush outer peripheral wall 33b is increased due to the outer peripheral ribs 33f and 33g. That is, the rigidity of the right portion of the Y-axis of the brush card assembly 30 is higher than the rigidity of the left portion of the Y-axis.

The brush outer peripheral wall 33b has a brush card concave portion 33h which is concavely recessed inward in the radial direction. As shown in FIGS. 4 and 5, the brush card concave portion 33h is opposite to the protrusion 16a of the back cover 12 in the radial direction. A space formed by the brush card concave portion 33h and the protrusion 16a becomes a flow hole A4 which will be described below with respect to the flow of gas and liquid. The flow hole A4 is in communication with a first gap A1 and the second gap A2 which will be described below. That is, the flow hole A4 serving as a space through which air and liquid can flow is formed between the brush card concave portion 33h and the protrusion 16a. Since the flow hole A4 is not at the position in a direction of the rotation shaft of the motor 1 but at the position in the radial direction, the flow hole A4 is disposed on a lower side with regard to the direction of gravity when the central axis is configured to have a predetermined angle with respect to the direction of gravity. Therefore, when liquid is present inside the brush card assembly 30, the liquid is collected in the protrusion 16a by its own weight and is discharged to an outer side of the motor 1 through the flow hole A4.

The brush outer peripheral wall 33b has eight contact portions 33m positioned on a radially outer side thereof. The contact portions 33m protrude from a portion of the brush outer peripheral wall 33b in the axial direction. Four of the contact portions 33m are disposed at position corresponding to extending lines in the radial direction of the four brushes 51a to 51d extending in the radial direction. The other four of the contact portions 33m are disposed at intermediate positions in circumferential direction with respect to the contact portions 33*m* which are disposed at the position corresponding to the extending lines in the radial direction of the brushes 51*a* to 51*d*.

The contact portion 33*m* has a protrusion 33*n*, which protrudes toward the back cover cylindrical portion 16 and extends in the axial direction, at a substantially central position thereof in the radial direction. An outer diameter of the contact portion 33*m* is equal to or slightly greater than an inner diameter of the back cover cylindrical portion 16. An outer diameter of the protrusion 33*n* is greater than the inner diameter of the back cover cylindrical portion 16 and the outer diameter of the contact portion 33*m*. Therefore, the contact portion 33*m* and the protrusion 33*n* are in contact with the inner peripheral wall of the back cover cylindrical portion 16. Since the contact portion 33*m* has a shape protruding from a portion of the brush outer peripheral wall 33*b* in the axial direction, the brush outer peripheral wall 33*b* and the back cover cylindrical portion 16 are spaced apart from each other in the radial direction through a third gap A3 at both positions of the contact portion 33*m* in the axial direction. The third gap A3 is in communication with the second gap A2 positioned between an outer peripheral wall of the brush card cylindrical portion 33 and the back cover cylindrical portion 16. That is, the third gap A3, which is in communication with the second gap A2 and serves as a space through which air and liquid can flow, is formed on at least one side of the contact portions 33*m* in the axial direction. The protrusion 33*n* is pressed and crushed at least partially by being strongly pressed against the inner peripheral wall of the back cover cylindrical portion 16.

When the motor 1 is assembled, the brush card assembly 30 is press-fitted into the back cover 12 by an operator. When the brush card assembly 30 is press-fitted, the contact portion 33*m* is brought into contact with the inner peripheral wall of the back cover cylindrical portion 16 of the back cover 12 and is press-fitted. Further, the protrusion 33*n* is strongly pressed against the inner peripheral wall of the back cover cylindrical portion 16 and is press-fitted while being pressed and crushed.

As described above, in the brush card assembly 30, the nip portions 75 to 77 are nipped by the housing 11 and the back cover 12, and the contact portion 33*m* is in contact with the inner circumferential surface of the back cover cylindrical portion 16. Thereby, the brush card assembly 30 is firmly supported with respect to the back cover 12. When the brush card assembly 30 is firmly supported with respect to the back cover 12, vibration of the brush card assembly 30 when the motor 1 rotates may be suppressed and generation of noise caused by the vibration may be suppressed.

In particular, since four of the plurality of contact portions 33*m* are disposed at the positions corresponding to the extending lines in the radial direction of the brushes 51*a* to 51*d* extending in the radial direction, the vibration of the brush card assembly 30 caused by the vibration of the brushes 51*a* to 51*d* may be effectively suppressed. However, it is not always necessary that the contact portions 33*m* are disposed at the positions corresponding to the extending lines in the radial direction of four brushes 51*a* to 51*d* extending in the radial direction. However, with such an arrangement, the vibration may be more effectively suppressed.

In addition, since the contact portion 33*m* has the protrusion 33*n*, the protrusion 33*n* is properly pressed and crushed when assembled so that the back cover cylindrical portion 16 and the brush card assembly 30 may be fitted without any gap even when there is a dimensional error between the back cover cylindrical portion 16 and the brush card assembly 30. In particular, since the protrusion 33*n* is formed of a resin and is relatively easily deformed when assembled, the back cover cylindrical portion 16 and the brush card assembly 30 may be easy fitted without any gap.

The brush card bottom surface portion 34 holds a bottom surface portion of the plate portion 70. The brush card bottom surface portion 34 has an annular shape having a circular opening 36 with respect to the central axis J. The brush card bottom surface portion 34 has a substantially annular shape with respect to the central axis J. The commutator 25 is positioned on an inner side of the brush card bottom surface portion 34. The brush card bottom surface portion 34 faces the back cover bottom surface portion 17. The brush card bottom surface portion 34 is spaced apart from the back cover bottom surface portion 17 through the first gap A1 in the axial direction. That is, the first gap A1 serving as a space through which air and liquid can flow is formed between the brush card bottom surface portion 34 and the back cover bottom surface portion 17.

The brush card bottom surface portion 34 holds the brush units 50*a* to 50*d*, which include the brushes 51*a* to 51*d*, and components including the choke coils 61 and 62.

The brush card bottom surface portion 34 has a plurality of through-holes 34*a*. The plurality of through-holes 34*a* pass through the brush card bottom surface portion 34 in the axial direction. The through-holes 34*a* allow the gas or liquid inside the brush card assembly 30 to flow and be discharged to the outer side of the brush card assembly 30 therethrough. When viewed from the XY plane, a region of the through-hole 34*a* on the left side of the Y-axis is wider than that on the right side of the Y-axis. Therefore, the rigidity on the right side of the Y-axis of the brush card assembly 30 becomes higher than the rigidity on the left side of the Y-axis due to the through-hole 34*a*.

As shown in FIGS. 6 and 7, the brush card bottom surface portion 34 has bottom surface ribs 34*b* to 34*e* at positions close to the connector portion 35 on the right side of the Y-axis. The bottom surface ribs 34*b* to 34*e* extend in the axial direction from the brush card bottom surface portion 34 toward the front side.

When viewed from the XY plane, the bottom surface rib 34*b* extends in the radial direction from an outer periphery of the opening 36 along the X-axis. The bottom surface rib 34*c* extends from an intermediate position of the bottom surface rib 34*b* toward the connector outer peripheral wall 33*a* of the brush card cylindrical portion 33. The bottom surface rib 34*d* extends in a direction perpendicular to the X-axis across the brush card cylindrical portion 33. The bottom surface rib 34*e* extends in a direction parallel to the X-axis from a position at which the bottom surface ribs 34*c* and 34*d* cross. Due to the bottom surface ribs 34*b* to 34*e*, the rigidity on the right side of the Y-axis of the brush card assembly 30 becomes higher than the rigidity on the left side.

The brush card inner peripheral walls 36*a* and 36*b* are positioned on a portion of the outer periphery of the opening 36 of the brush card bottom surface portion 34. The brush card inner peripheral walls 36*a* and 36*b* extend in the axial direction from an inner edge of the brush card bottom surface portion 34.

The connector portion 35 is connected to an outer side surface of the connector outer peripheral wall 33*a* in the radial direction on the right side of the Y-axis. The connector portion 35 extends radially outward along the X-axis. Although not shown, the connector portion 35 has a cylindrical shape that opens radially outward. In an inner side of the connector portion 35, an outer end in the radial direction of the positive electrode side connection terminal 71*a* and an outer end in the radial direction of the negative electrode side connection terminal 71*b* are exposed. The positive electrode side connection terminal 71*a* and the negative electrode side connection terminal 71*b* pass through the inner side of the connector portion 35 and are electrically connected to an external power source. That is, the connector portion 35 applies driving power to the motor 1 through the positive electrode side connection terminal 71*a* and the negative electrode side connection terminal 71*b*.

The brush units 50*a* to 50*d* each include a brush 51*a*, a box-shaped brush case 50*a*2 which accommodates the brush 51*a* and extends in the radial direction, and a coil spring 50*a*3 accommodated in the brush case 50*a*2. The brush case 50*a*2 is formed by bending a metal plate, and a bottom surface and an inner side surface of the brush case 50*a*2 open. The coil spring 50*a*3 is interposed between an outer side surface in the radial direction of the brush case 50*a*2 and an outer side surface in the radial direction of the brush 51*a* and elastically presses the brush 51*a* radially inward. The other brush units 50*b* to 50*d* have the same configuration. The brush units 50*a* to 50*d* are provided on the brush unit installation portions 72*a* to 72*d*, respectively. Accordingly, the brushes 51*a* to 51*d* are elastically pressed radially inward in the brush case 50*a*2 and are movably accommodated in the brush case 50*a*2 in the radial direction. The brushes 51*a* to 51*d* are brought into contact with the commutator 25 positioned in the radially inward direction while being subjected to force radially pressing inward. The brush 51*a* is connected to a pigtail 51*a*1 formed of a mesh wire to conduct the brush 51*a*. The pigtail 51*a*1 is drawn to the outside through a slit of a ceiling surface of the brush case 50*a*2 and is electrically connected to the plate portion 70 that constitutes a circuit.

Specifically, as shown in FIG. 7, the brush unit installation portion 72*a* and the brush unit 50*a* are disposed on the right side of the Y-axis so as to form an angle of approximately 67.5 degrees with respect to the X-axis (A). The brush unit installation portion 72*b* and the brush unit 50*b* are disposed on the left side of the Y-axis so as to form an angle of approximately 22.5 degrees with respect to the X-axis (B). The brush unit installation portion 72*c* and the brush unit 50*c* are disposed on the left side of the Y-axis so as to form the angle of approximately 22.5 degrees with respect to the X-axis in a direction opposite to the brush unit 50*b* (C). The brush unit installation portion 72*d* and the brush unit 50*d* are disposed on the right side of the Y-axis so as to form the angle of approximately 67.5 degrees with respect to the X-axis in a direction opposite to the brush unit 50*a* (D).

Figure 8:
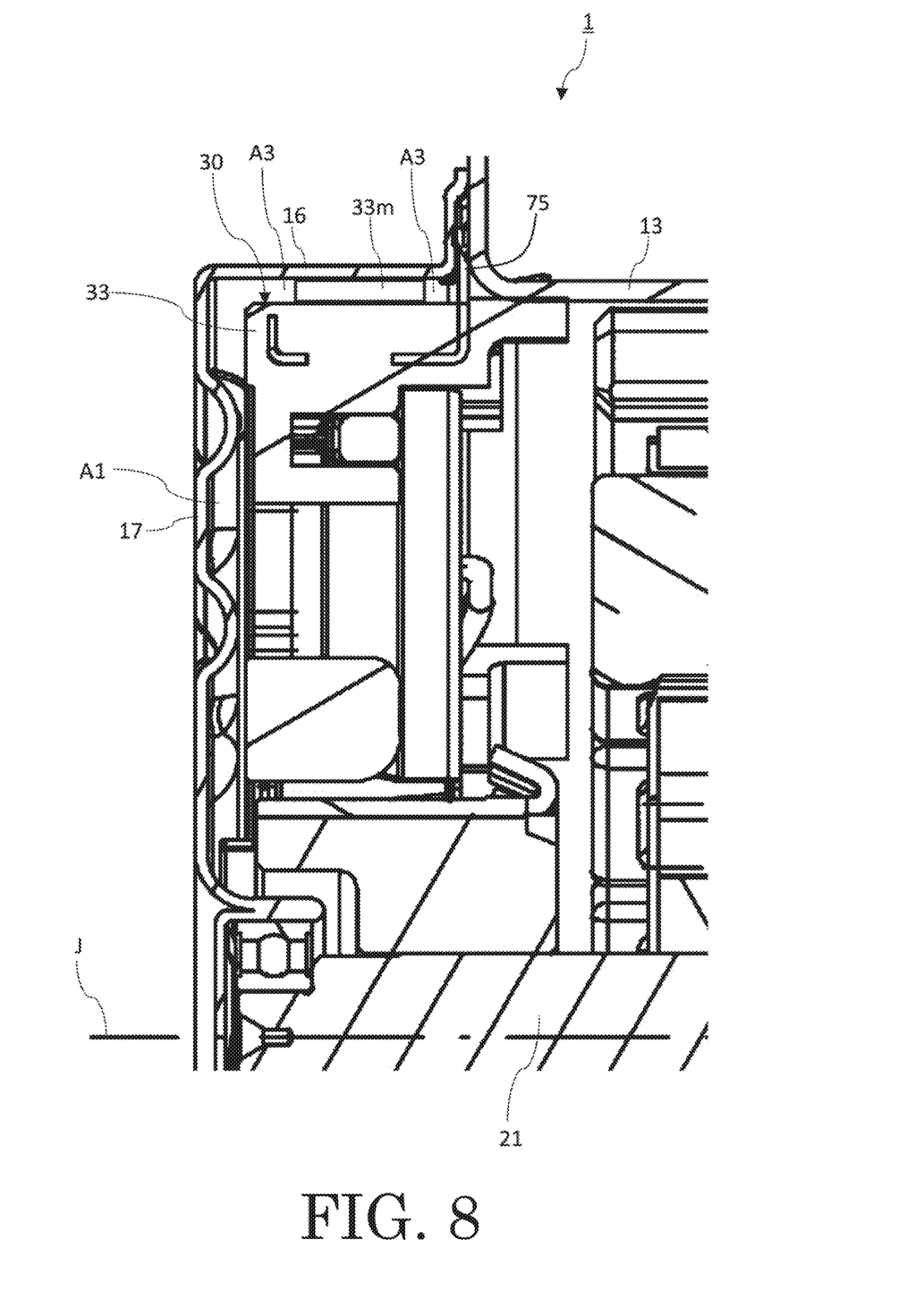
FIG. 8 is a view showing a flow path of gas and liquid in the motor.
Figure 9:
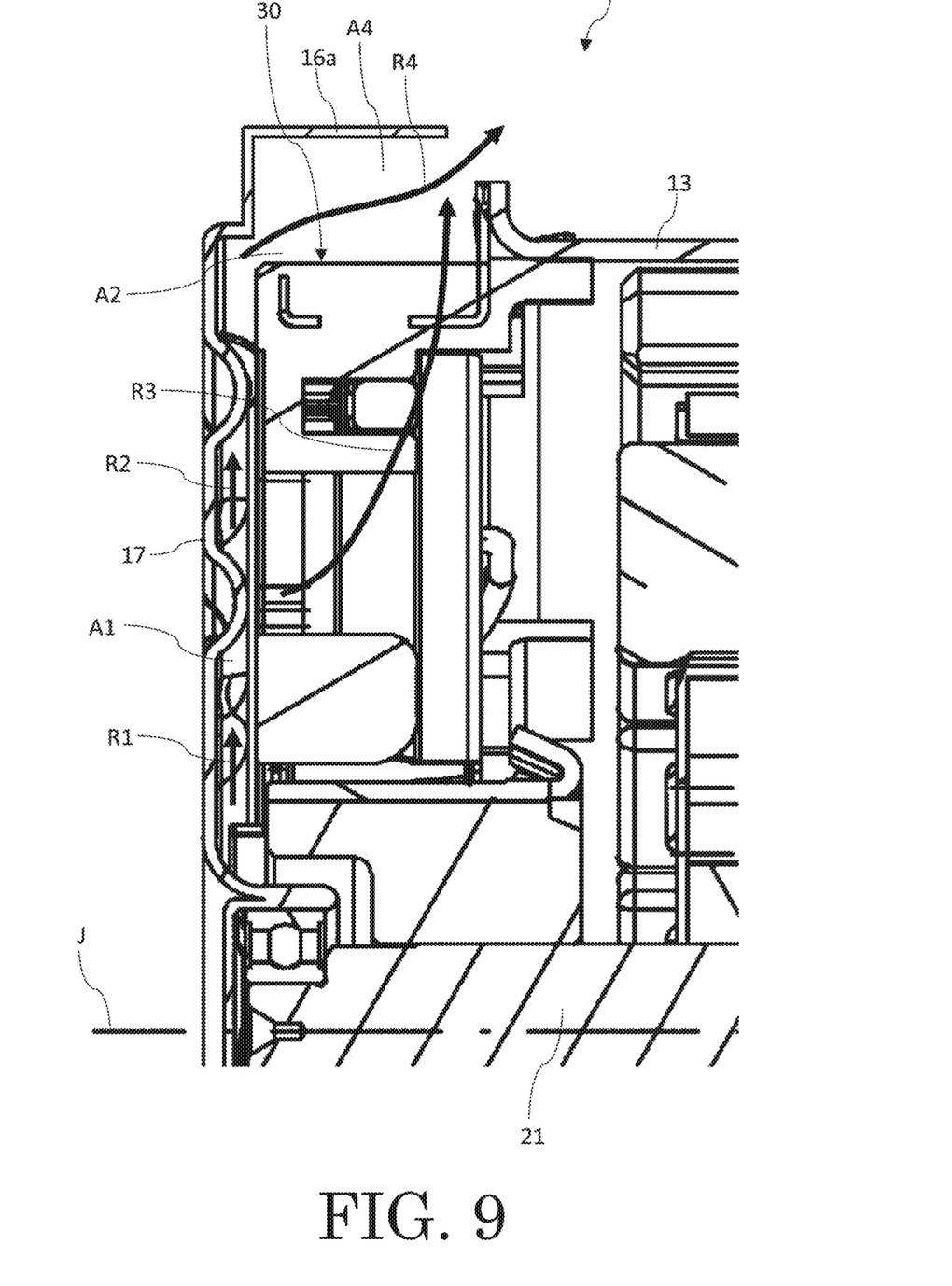
FIG. 9 is a view showing a flow path of gas and liquid in the motor.

FIGS. 8 and 9 are cross-sectional views of the motor 1 which show flow paths of gas such as air and liquid such as water in the motor 1. FIG. 8 shows a cross section of the motor 1 at a position including the contact portion 33*m* from the central axis J toward the radial direction. FIG. 9 shows a cross section of the motor 1 at a position including the protrusion 16*a* from the central axis J toward the radial direction. Further, in the present example embodiment, the liquid such as water indicates a flow path when the liquid inevitably introduced into the housing body 10 is discharged to the outside of the housing body 10 according to a use environment of the motor 1.

As shown in FIG. 8, the brush card bottom surface portion 34 and the back cover bottom surface portion 17 are disposed to be spaced apart from each other in the axial direction through the first gap A1. The third gap A3, which is in communication with the second gap, is formed at a position in which the outer peripheral wall of the brush card cylindrical portion 33 is opposite to the back cover cylindrical portion 16 in at least one side of the contact portions 33*m* in the axial direction. As shown in FIG. 9, the outer peripheral wall of the brush card cylindrical portion 33 and the back cover cylindrical portion 16 are disposed to be spaced apart from each other in the radial direction through the second gap A2. The flow hole A4 is formed between the brush card concave portion 33*h* and the protrusion 16*a*.

When the motor 1 rotates, the gas inside the housing body 10 is subjected to force directed in the radially outward direction by centrifugal force of the rotor 20 and is extruded. In this case, the gas inside the brush card assembly 30 flows into the outer side of the brush card assembly 30 from the notch portions 33*d* and 33*e*, the through-hole 34*a*, and the like. The gas which flows into the outer side from the brush card bottom surface portion 34 passes through flow paths of R1 and R2 of the first gap A1 shown in FIG. 9 and flows into the second gap A2 or the flow hole A4.

Meanwhile, the gas which flows into the outer side of the brush card assembly 30 from the notch portions 33*d* and 33*e* passes through a flow path R3 shown in FIG. 9 and flows into the second gap A2. The gas in the second gap A2 directly flows into the flow hole A4 or passes through the third gap A3 and then flows into the flow hole A4.

The gas which flows into the flow hole A4 passes through the flow path of R4 and is discharged to an outer space of the motor 1.

The gas, which is discharged from the inner side of the rotor 10 to the outer space of the motor 1, flows into the first gap A1, the second gap A2, the third gap A3, and the flow hole A4 from the periphery of the brushes 51*a* to 51*d* and the commutator 25, which are particularly liable to generate heat due to friction and sparks between the brushes 51*a* to 51*d* and the commutator 25 when the motor 1 rotates. As a result, heat dissipation may be enhanced in the brush card assembly 30, and heat generation inside the motor 1 may be suppressed.

The liquid such as water that has entered the housing body 10 from the upper surface side hole portion 14*a* or the bottom surface side hole portion 17*a* passes through the flow path through which the liquid is discharged to the outer space by the flow of the gas described above while being evaporated, passes through the flow path through which the liquid is discharged from the protrusion 16*a* passing through the inner peripheral wall of the back cover cylindrical portion 16, or passes through the flow path through which the liquid is discharged from the housing through-hole 13 passing through the inner peripheral wall of the housing cylindrical portion 13.

In particular, since the third gap A3 is in communication with the second gap A2, the contact portion 33*m* may not impede the flow of the gas, flowability of the gas in the second gap may be improved, and heat generation inside the motor 1 may be further effectively suppressed.

The motor of the present disclosure is not limited to the above-described example embodiment and includes various forms that can be considered from the above-described example embodiments. For example, the motor of the present disclosure may have a configuration of the following modified example. Further, the same configuration as that in the above-described example embodiment is denoted by the same names or reference numerals, and a description thereof may be omitted.

In the example embodiment, the flow hole A4 formed by the brush card concave portion 33*h* and the protrusion 16*a* is shown as being in communication with both of the first gap A1 between the brush card bottom surface portion 34 and the back cover bottom surface portion 17 and the second gap A2 between the outer peripheral wall of the brush card cylindrical portion 33 and the back cover cylindrical portion 16. However, the flow hole A4 may be in communication with any one side of the first gap A1 and the second gap A2. Even when such a configuration is employed, heat generation of the brush card assembly 30 may be suppressed.

In the example embodiment, the flow hole A4 is shown as being formed at a position at which the back cover 12 and the brush card assembly 30 face each other, but the present disclosure is not necessarily limited to such a position, and the housing 11 may have the flow hole A4. However, when the housing 11 has the flow hole A4, the flow hole A4 and the first gap A1 are not in communication with each other, whereas the flow hole A4 is in communication with the second gap A2. Even when such a configuration is employed, heat generation of the brush card assembly 30 may be suppressed.

The contact portion 33m of the outer side in the radial direction of the brush outer peripheral wall 33b may be disposed at a position including an outer portion in the radial direction of the brush card bottom surface portion 34. That is, the contact portion 33m may be provided so as to extend from a rear side end portion of the brush outer peripheral wall 33b in the axial direction. Since vibration of the brush card assembly 30 is mainly caused by the brush units 50a to 50d and is strongly transmitted to the brush card bottom surface portion 34, the vibration of the brush card bottom surface portion 34 may be more effectively suppressed and the vibration of the entire brush card assembly 30 may be suppressed with this configuration.

The motor of the present disclosure is mainly used as a motor of an engine cooling fan of an automobile. In addition, the motor of the present disclosure is used, for example, as a brake motor or an electric power steering motor. Further, the motor of the present disclosure may be used for various purposes other than automobiles. For example, the motor of the present disclosure may be used in electric assist bicycles, electric bikes, household appliances, office automation (OA) devices, and medical devices.

Further, the motor of the present disclosure may also constitute a generator with the same structure. The motor of the present disclosure may also be used, for example, as a generator used in automobiles, electric assist bicycles, wind power generators, and the like.

According to a rotor according to a first exemplary aspect of the present disclosure, a configuration can be obtained in which a brush card assembly has a contact portion so that the brush card assembly is stably supported with respect to a back cover. Further, by employing a configuration having a first gap, a second gap, and a flow hole, flowability of gas and liquid can be increased so that heat generation inside a motor can be suppressed.

The present disclosure may be used, for example, as a motor for an engine cooling fan of an automobile or the like.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
a rotor including a shaft that extends in an axial direction with respect to a central axis;
a permanent magnet positioned on a radially outer side of the rotor;
a brush card assembly that supplies power to the rotor;
a back cover that supports the brush card assembly; and
a housing that accommodates the brush card assembly, the rotor, and the permanent magnet together with the back cover; wherein
the rotor includes:
a core fixed to the shaft,
a coil that magnetizes the core, and
a commutator electrically connected to the coil,
the back cover includes:
a back cover bottom surface portion, and
a back cover cylindrical portion defined on an outer periphery of the back cover bottom surface portion to have a cylindrical shape,
the brush card assembly includes:
a brush card bottom surface portion spaced apart from the back cover bottom surface portion in the axial direction through a first gap, the brush card bottom surface portion holding a plurality of brushes,
a nip portion nipped by the back cover and the housing,
an outer peripheral wall spaced apart from the back cover cylindrical portion in a radial direction through a second gap, and
contact portions in contact with the back cover cylindrical portion on the outer peripheral wall,
at least one side of the housing and the back cover includes a flow hole through which at least one side of the first gap and the second gap is in communication with an outer space of the motor,
the brush card bottom surface portion includes first and second bottom surface ribs, the first and second bottom surface ribs extent in the axial direction from the brush card bottom surface portion toward a front side of the motor,
when seen from the axial direction, the first bottom surface rib extends in the radial direction from an outer periphery of an opening in the brush card assembly, and
the second bottom surface rib extends from an intermediate portion of the first bottom surface rib toward the outer peripheral wall.

2. The motor of claim 1, wherein a third gap, which is in communication with the second gap, is provided on at least one side of the contact portions in the axial direction.

3. The motor of claim 1, wherein
the central axis of the motor has a predetermined angle with respect to a direction of gravity; and
the flow hole is positioned on a lower side with regard to a direction of gravity.

4. The motor of claim 1, wherein the contact portions are disposed at positions corresponding to extending lines of the plurality of brushes extending in the radial direction on an outer circumferential surface of the brush card assembly.

5. The motor of claim 1, wherein the contact portions each include a protrusion that protrudes toward the back cover cylindrical portion and extends in the axial direction.

6. The motor of claim 1, wherein the contact portions are disposed at positions including an outer portion in the radial direction of the brush card bottom surface portion.

7. The motor of claim 1, wherein
the brush card assembly includes a ground potential supply portion electrically connected to a ground potential; and
the nip portion is a portion of the ground potential supply portion.

8. The motor of claim 1, wherein
the brush card assembly further includes a connector portion that supplies power from an outer side thereof, and
the connector portion is nipped by the housing and the back cover.

9. The motor of claim 1, wherein
any one of the housing and the back cover includes a plurality of claw portions that protrude toward the other of the housing and the back cover; and
the other of the housing and the back cover is press-fitted and swaged into the claw portion and connected to the one of the housing and the back cover.

10. The motor of claim 9, wherein
the other of the housing and the back cover includes a plurality of flange portions that protrude in the radial direction; and
the plurality of claw portions are disposed at positions at which the plurality of flange portions are interposed between the plurality of claw portions in the circumferential direction.

11. The motor of claim 10, wherein
the one of the housing and the back cover includes a plurality of concave portions that extend in the radial direction; and
the plurality of concave portions and the plurality of claw portions are disposed at positions at which the plurality of concave portions and the plurality of claw portions overlap in the circumferential direction on a plane perpendicular or substantially perpendicular to the central axis.

12. The motor of claim 10, wherein
the one of the housing and the back cover includes six claw portions that protrude toward the other of the housing and the back cover to contact an outer circumferential surface of the other of the housing and the back cover;
the other of the housing and the back cover includes three flange portions that protrude in the radial direction; and
the six claw portions are disposed at positions at which the three flange portions are interposed between the six claw portions in the circumferential direction.

13. The motor of claim 1, wherein
the brush card bottom surface portion includes a third bottom surface rib,
the third bottom surface rib extends in the axial direction from the brush card bottom surface portion toward the front side of the motor,
the third bottom surface rib extends in a direction perpendicular to the radial direction across the brush card cylindrical portion.

14. The motor of claim 13, wherein
the brush card bottom surface portion includes a fourth bottom surface rib,
the fourth bottom surface rib extends in the axial direction from the brush card bottom surface portion toward the front side of the motor,
the fourth bottom surface rib extends in a direction parallel to the radial direction from a position at which the second bottom surface rib and the third bottom surface rib cross.

* * * * *